United States Patent
Jeong et al.

(10) Patent No.: US 11,674,036 B2
(45) Date of Patent: Jun. 13, 2023

(54) THERMOPLASTIC POLYCARBONATE RESIN COMPOSITION INCLUDING AROMATIC POLYPHOSPHONATE AND ORGANIC ACID AND ARTICLE PRODUCED THEREFROM

(71) Applicant: LOTTE CHEMICAL CORPORATION, Seoul (KR)

(72) Inventors: Da Heen Jeong, Uiwang-si (KR); Tae Gon Kang, Uiwang-si (KR); Eun Taek Woo, Uiwang-si (KR); Sang Hoon Lee, Uiwang-si (KR); Young Ho Park, Uiwang-si (KR); So Hyang Shin, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 53 days.

(21) Appl. No.: 16/997,995

(22) Filed: Aug. 20, 2020

(65) Prior Publication Data

US 2021/0061993 A1    Mar. 4, 2021

(30) Foreign Application Priority Data

Aug. 30, 2019   (KR) .................. 10-2019-0107511

(51) Int. Cl.
| | | |
|---|---|---|
| *C08L 69/00* | (2006.01) | |
| *C08L 67/02* | (2006.01) | |
| *C08L 85/02* | (2006.01) | |
| *C08K 5/092* | (2006.01) | |
| *C08L 67/03* | (2006.01) | |

(52) U.S. Cl.
CPC .............. *C08L 67/03* (2013.01); *C08L 67/02* (2013.01); *C08L 69/00* (2013.01); *C08L 85/02* (2013.01)

(58) Field of Classification Search
None
See application file for complete search history.

(56) References Cited

U.S. PATENT DOCUMENTS

| | | | |
|---|---|---|---|
| 6,784,233 B1 * | 8/2004 | Weber | C08K 5/092 |
| | | | 524/126 |
| 8,067,493 B2 | 11/2011 | Zhu et al. | |
| 2007/0135544 A1 | 6/2007 | Seidel et al. | |
| 2012/0165442 A1 | 6/2012 | Feldermann et al. | |
| 2012/0259058 A1 * | 10/2012 | Ko | C08L 69/00 |
| | | | 524/537 |
| 2014/0303296 A1 | 10/2014 | Inazawa et al. | |
| 2017/0247539 A1 | 8/2017 | Chen et al. | |

FOREIGN PATENT DOCUMENTS

| | | |
|---|---|---|
| CN | 102695753 A | 9/2012 |
| CN | 106687527 A | 5/2017 |
| EP | 3209728 A1 | 8/2017 |
| JP | 2002-294060 A | 10/2002 |
| KR | 10-1946671 B1 | 4/2019 |

OTHER PUBLICATIONS

Extended Search Report in counterpart European Application No. 20193030.2 dated Feb. 5, 2021, pp. 1-5.

* cited by examiner

*Primary Examiner* — David J Buttner
(74) *Attorney, Agent, or Firm* — Additon, Pendleton & Witherspoon, P.A.

(57) ABSTRACT

A thermoplastic resin composition comprises: about 100 parts by weight of a polycarbonate resin; about 50 parts by weight to about 250 parts by weight of a polyester resin; about 10 parts by weight to about 200 parts by weight of an aromatic polyphosphonate having a weight average molecular weight of about 65,000 g/mol to about 130,000 g/mol; and about 0.1 parts by weight to about 2 parts by weight of an organic acid comprising citric acid, lactic acid, malic acid, tartaric acid, and/or glycolic acid.

15 Claims, No Drawings

THERMOPLASTIC POLYCARBONATE RESIN COMPOSITION INCLUDING AROMATIC POLYPHOSPHONATE AND ORGANIC ACID AND ARTICLE PRODUCED THEREFROM

CROSS-REFERENCE TO RELATED APPLICATION

This application claims priority under 35 USC Section 119 to and the benefit of Korean Patent Application No. 10-2019-0107511, filed on Aug. 30, 2019, the entire disclosure of which is incorporated herein by reference.

FIELD

The present invention relates to armoplastic resin composition and an article produced therefrom.

BACKGROUND

As engineering plastics, polycarbonate resins have good properties in terms of impact resistance, heat resistance, dimensional stability, weather resistance, flame retardancy, transparency, and electrical properties. With these advantages, the polycarbonate resin is generally used for materials requiring physical durability. In contrast, polyester resins, such as polybutylene terephthalate and the like, generally have poor flame retardancy despite better chemical resistance than polycarbonate resin.

Polycarbonate resin and polyester resin can be used together to improve chemical resistance and flame retardancy of the polycarbonate resin and the polyester resin, respectively. Residual polyester resin catalyst, however, can promote trans-esterification between the polycarbonate resin and the polyester resin. This can result not only in deteriorated flame retardancy but also deteriorated physical and chemical durability, as compared to the use of polycarbonate resin and polyester resin alone.

Therefore, there is a need for armoplastic resin composition having good properties in terms of flame retardancy, heat resistance, chemical resistance, and balance therebetween.

SUMMARY OF THE INVENTION

The present disclosure relates to armoplastic resin composition that can have good properties in terms of flame retardancy, heat resistance, chemical resistance, and the like, and an article produced therefrom.

The thermoplastic resin composition comprises: about 100 parts by weight of a polycarbonate resin; about 50 parts by weight to about 250 parts by weight of a polyester resin; about 10 parts by weight to about 200 parts by weight of an aromatic polyphosphonate having a weight average molecular weight of about 65,000 g/mol to about 130,000 g/mol; and about 0.1 parts by weight to about 2 parts by weight of an organic acid comprising citric acid, lactic acid, malic acid, tartaric acid, and/or glycolic acid.

The polyester resin may comprise polyethylene terephthalate, polybutylene terephthalate, polyethylene naphthalate, polytrimethylene terephthalate, and/or polycyclohexylene terephthalate.

The polyester resin may comprise polyethylene terephthalate and/or polybutylene terephthalate.

The polyester resin may be present in an amount of about 50 parts by weight to about 200 parts by weight relative to about 100 parts by weight of the polycarbonate resin.

The aromatic polyphosphonate may be represented by Formula 1:

[Formula 1]

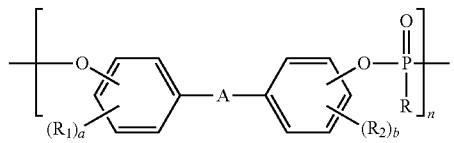

wherein each A is independently a single bond, a $C_1$ to $C_5$ alkylene group, a $C_1$ to $C_5$ alkylidene group, a $C_5$ to $C_6$ cycloalkylidene group, —S— or —$SO_2$—; each R is independently a substituted or unsubstituted $C_6$ to $C_{20}$ aryl group or a substituted or unsubstituted $C_6$ to $C_{20}$ aryloxy group; $R_1$ and $R_2$ are each independently a substituted or unsubstituted $C_1$ to $C_6$ alkyl group, a substituted or unsubstituted $C_3$ to $C_6$ cycloalkyl group, or a substituted or unsubstituted $C_6$ to $C_{12}$ aryl group, or a halogen atom; a and b are each independently an integer of 0 to 4; and n is an integer of 100 to 450.

The polyester resin and the aromatic polyphosphonate may be present in a weight ratio of about 1:0.1 to about 1:1.5.

The polyester resin and the organic acid may be present in a weight ratio of about 50:1 to about 350:1.

The aromatic polyphosphonate and the organic acid may be present in a weight ratio of about 1:0.001 to about 1:0.1.

The thermoplastic resin composition may have a combustion time of about 1 second to about 50 seconds, as measured on a specimen having a size of 120 mm×13 mm×2 mm in accordance with UL-94.

The thermoplastic resin composition may have a Vicat softening temperature of about 90° C. to about 140° C., as measured under a load of 5 kg at 50° C./hr in accordance with ISO 306.

The thermoplastic resin composition may allow about 5 or fewer specimens to have cracks when 10 Type I ⅛" thick tensile specimens manufactured in accordance with ASTM D638 are coated with 0.5 mL of a liquid extracted from a cleaning tissue (Product name: Super P Sani-cloth AFIII, Manufacturer: PDI) and left on a 1.0% strain curved jig for 1 minute.

The present disclosure also relates to an article. The article may be formed of the thermoplastic resin composition according to any of the embodiments of the present disclosure.

DETAILED DESCRIPTION

The above and other aspects, features, and advantages of the present invention will become apparent from the detailed description of the following embodiments. It should be understood that the present invention is not limited to the following embodiments and may be embodied in different ways by those skilled in the art without departing from the scope of the present invention. Rather, the embodiments are provided for complete disclosure and to provide thorough understanding of the present invention by those skilled in the art. The scope of the present invention should be defined only by the appended claims.

A thermoplastic resin composition according to the present disclosure comprises: (A) a polycarbonate resin; (B) a polyester resin; (C) an aromatic polyphosphonate; and (D) an organic acid.

(A) Polycarbonate Resin

The polycarbonate resin according to embodiments of the present disclosure may be a polycarbonate resin used in typical thermoplastic resin compositions. For example, the polycarbonate resin may be an aromatic polycarbonate resin obtained by reacting a precursor, such as phosgene, halogen formate and/or carbonic diester, with diphenol(s) (aromatic diol compounds).

Examples of the diphenols may comprise 4,4'-biphenol, 2,2-bis(4-hydroxyphenyl)propane, 2,4-bis(4-hydroxyphenyl)-2-methylbutane, 1,1-bis(4-hydroxyphenyl)cyclohexane, 2,2-bis(3-chloro-4-hydroxyphenyl)propane, and/or 2,2-bis(3,5-dichloro-4-hydroxyphenyl)propane, and the like, and mixtures and/or combinations thereof, without being limited thereto. For example, the diphenols may include 2,2-bis(4-hydroxyphenyl)propane, 2,2-bis(3,5-dichloro-4-hydroxyphenyl)propane, and/or 1,1-bis(4-hydroxyphenyl)cyclohexane, for example, may include 2,2-bis-(4-hydroxyphenyl)propane, which is also referred to as bisphenol A.

The polycarbonate resin may be a branched polycarbonate resin. For example, the polycarbonate resin may be a branched polycarbonate resin obtained by adding about 0.05 mol % to about 2 mol % of a tri- or higher polyfunctional compound, for example, a tri- or higher valent phenol group-containing compound, based on the total number of moles of the diphenols used in polymerization.

The polycarbonate resin may be a homopolycarbonate resin, a copolycarbonate resin, or a blend thereof. The polycarbonate resin may be partially or completely replaced by an aromatic polyester-carbonate resin obtained by polymerization in the presence of an ester precursor, for example, a bifunctional carboxylic acid.

The polycarbonate resin may have a weight average molecular weight (Mw) of about 10,000 g/mol to about 200,000 g/mol, for example, about 15,000 g/mol to about 80,000 g/mol, as measured by gel permeation chromatography (GPC). Within this range, the thermoplastic resin composition can have good flowability (processability), and the like.

(B) Polyester Resin

The polyester resin according to embodiments of the present disclosure may be a polyester resin used in typical thermoplastic resin compositions. For example, the polyester resin may be obtained by polycondensation of a dicarboxylic acid component and a diol component.

The dicarboxylic acid component may include (be derived from) one or more aromatic dicarboxylic acids and/or aromatic dicarboxylates. Examples of the aromatic dicarboxylic acids may include without limitation terephthalic acid (TPA), isophthalic acid (IPA), 1,2-naphthalene dicarboxylic acid, 1,4-naphthalene dicarboxylic acid, 1,5-naphthalene dicarboxylic acid, 1,6-naphthalene dicarboxylic acid, 1,7-naphthalene dicarboxylic acid, 1,8-naphthalene dicarboxylic acid, 2,3-naphthalene dicarboxylic acid, 2,6-naphthalene dicarboxylic acid, and/or 2,7-naphthalenedicarboxylic acid, and the like, and mixtures and/or combinations thereof. Examples of the aromatic dicarboxylates may include without limitation dimethyl terephthalate (DMT), dimethyl isophthalate, dimethyl-1,2-naphthalate, dimethyl-1,5-naphthalate, dimethyl-1,7-naphthalate, dimethyl-1,8-naphthalate, dimethyl-2,3-naphthalate, dimethyl-2,6-naphthalate, and/or dimethyl-2,7-naphthalate, and the like, and mixtures and/or combinations thereof.

The diol component may include (be derived from) without limitation ethylene glycol, 1,2-propylene glycol, 1,3-propylene glycol, 2,2-dimethyl-1,3-propane diol, 1,3-butane diol, 1,4-butane diol, 1,5-pentane diol, 1,6-hexane diol, and/or cycloalkylene diol, and the like, and mixtures and/or combinations thereof.

Examples of the polyester resin may include without limitation polyethylene terephthalate (PET), polybutylene terephthalate (PBT), polyethylene naphthalate (PEN), polytrimethylene terephthalate (PTT), and/or polycyclohexylene terephthalate (PCT), and the like, and mixtures and/or combinations thereof. For example, the polyester resin may include polyethylene terephthalate, polybutylene terephthalate, or a combination and/or mixture thereof.

The polyester resin may have a weight average molecular weight of about 3,000 g/mol to about 200,000 g/mol, for example, about 5,000 g/mol to about 150,000 g/mol, as measured in a hexafluoroisopropanol (HFIP) solvent by gel permeation chromatography (GPC). Within this range, the thermoplastic resin composition can have good processability, impact resistance, stiffness, and the like.

The thermoplastic resin composition can include the polyester resin in an amount of about 50 parts by weight to about 250 parts by weight, for example, about 50 parts by weight to about 200 parts by weight, relative to about 100 parts by weight of the polycarbonate resin. In some embodiments, the thermoplastic resin composition can include the polyester resin in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, or 250 parts by weight based on about 100 parts by weight of the polycarbonate resin. Further, according to some embodiments, the polyester resin can be present in an amount of from about any of the foregoing amounts to about any other of the foregoing amounts.

If the amount of the polyester resin is less than about 50 parts by weight relative to about 100 parts by weight of the polycarbonate resin, the thermoplastic resin composition can suffer from deterioration in chemical resistance, and if the amount of the polyester resin exceeds about 250 parts by weight, the thermoplastic resin composition can suffer from deterioration in flame retardancy and the like.

(C) Aromatic Polyphosphonate

The aromatic polyphosphonate may be used together with the organic acid to improve flame retardancy, chemical resistance, flowability, and the like of the thermoplastic resin composition.

The aromatic polyphosphonate may have a weight average molecular weight (Mw) of about 65,000 g/mol to about 130,000 g/mol, for example, about 70,000 g/mol to about 120,000 g/mol, as measured by GPC. In some embodiments, the aromatic polyphosphonate may have a weight average molecular weight (Mw) of about 65,000, 66,000, 67,000, 68,000, 69,000, 70,000, 71,000, 72,000, 73,000, 74,000, 75,000, 76,000, 77,000, 78,000, 79,000, 80,000, 81,000, 82,000, 83,000, 84,000, 85,000, 86,000, 87,000, 88,000, 89,000, 90,000, 91,000, 92,000, 93,000, 94,000, 95,000, 96,000, 97,000, 98,000, 99,000, 100,000, 101,000, 102,000, 103,000, 104,000, 105,000, 106,000, 107,000, 108,000, 109,000, 110,000, 111,000, 112,000, 113,000, 114,000, 115,000, 116,000, 117,000, 118,000, 119,000, 120,000, 121,000, 122,000, 123,000, 124,000, 125,000, 126,000, 127,000, 128,000, 129,000, or 130,000 g/mol. Further, according to some embodiments, the aromatic polyphosphonate may have a weight average molecular weight (Mw) of from about any of the foregoing weight average molecular weights to about any other of the foregoing weight average molecular weights.

If the weight average molecular weight of the aromatic polyphosphonate is less than about 65,000 g/mol, the thermoplastic resin composition can suffer from deterioration in flame retardancy, chemical resistance, and the like, and if the weight average molecular weight of the aromatic polyphosphonate exceeds about 130,000 g/mol, the thermoplastic resin composition can suffer from deterioration in flowability and the like.

The aromatic polyphosphonate may be represented by Formula 1:

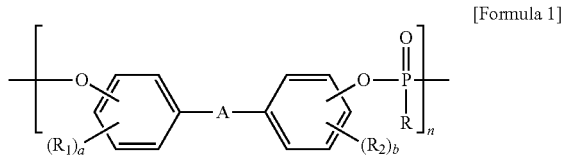

[Formula 1]

wherein each A is independently a single bond, a $C_1$ to $C_5$ alkylene group, a $C_1$ to $C_5$ alkylidene group, a $C_5$ to $C_6$ cycloalkylidene group, —S— or —$SO_2$—; each R is independently a substituted or unsubstituted $C_6$ to $C_{20}$ aryl group or a substituted or unsubstituted $C_6$ to $C_{20}$ aryloxy group; $R_1$ and $R_2$ are each independently a substituted or unsubstituted $C_1$ to $C_6$ alkyl group, a substituted or unsubstituted $C_3$ to $C_6$ cycloalkyl group, a substituted or unsubstituted $C_6$ to $C_{12}$ aryl group, or a halogen atom; a and b are each independently an integer of 0 to 4; and n is an integer of 100 to 450.

The aromatic polyphosphonate may be prepared by reacting an aromatic diol compound with phosphonic acid and/or an ester thereof.

Examples of the aromatic polyphosphonate may include without limitation bisphenol-A polyphosphonate, resorcinol polyphosphonate, and/or hydroquinone polyphosphonate, and the like, and mixtures and/or combinations thereof.

The thermoplastic resin composition may include the aromatic polyphosphonate in an amount of about 10 parts by weight to about 200 parts by weight, for example, about 10 parts by weight to about 150 parts by weight, relative to about 100 parts by weight of the polycarbonate resin. In some embodiments, the thermoplastic resin composition can include the aromatic polyphosphonate in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, or 200 parts by weight based on about 100 parts by weight of the polycarbonate resin. Further, according to some embodiments, the aromatic polyphosphonate can be present in an amount of from about any of the foregoing amounts to about any other of the foregoing amounts.

If the amount of the aromatic polyphosphonate is less than about 10 parts by weight relative to about 100 parts by weight of the polycarbonate resin, the thermoplastic resin composition can suffer from deterioration in flame retardancy, chemical resistance, and the like, and if the amount of the aromatic polyphosphonate exceeds about 200 parts by weight, the thermoplastic resin composition can suffer from deterioration in flowability and the like.

The polyester resin and the aromatic polyphosphonate may be present in a weight ratio (B:C) of about 1:0.1 to about 1:1.5, for example, about 1:0.2 to about 1:1. In some embodiments, the polyester resin and the aromatic polyphosphonate may be present in a weight ratio (B:C) of about 1:0.1, 1:0.2, 1:0.3, 1:0.4, 1:0.5, 1:0.6, 1:0.7, 1:0.8, 1:0.9, 1:1, 1:1.1, 1:1.2, 1:1.3, 1:1.4, or 1:1.5. Further, according to some embodiments, the polyester resin and the aromatic polyphosphonate may be present in a weight ratio (B:C) of from about any of the foregoing ratios to about any other of the foregoing ratios. Within this range, the thermoplastic resin composition can have better flame retardancy, chemical resistance, and the like.

(D) Organic Acid

The organic acid may be used together with the aromatic polyphosphonate to improve flame retardancy, chemical resistance, and heat resistance of the thermoplastic resin composition. Examples of the organic acid may include without limitation citric acid, lactic acid, malic acid, tartaric acid, and/or glycolic acid, and the like, and mixtures and/or combinations thereof.

The thermoplastic resin composition may include the organic acid in an amount of about 0.1 parts by weight to about 2 parts by weight, for example, about 0.2 parts by weight to about 1.5 parts by weight, relative to about 100 parts by weight of the polycarbonate resin. In some embodiments, the thermoplastic resin composition can include the organic acid in an amount of about 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, or 2 parts by weight based on about 100 parts by weight of the polycarbonate resin. Further, according to some embodiments, the organic acid can be present in an amount of from about any of the foregoing amounts to about any other of the foregoing amounts.

If the amount of the organic acid is less than about 0.1 parts by weight relative to about 100 parts by weight of the polycarbonate resin, the thermoplastic resin composition can suffer from deterioration in chemical resistance, heat resistance, flame retardancy, and the like, and if the amount of the organic acid exceeds about 2 parts by weight, the thermoplastic resin composition can suffer from deterioration in flame retardancy and the like.

The polyester resin and the organic acid may be present in a weight ratio (B:D) of about 50:1 to about 350:1, for example, about 100:1 to about 300:1. In some embodiments, the polyester resin and the organic acid may be present in a weight ratio (B:D) of about 50:1, 51:1, 52:1, 53:1, 54:1, 55:1, 56:1, 57:1, 58:1, 59:1, 60:1, 61:1, 62:1, 63:1, 64:1, 65:1, 66:1, 67:1, 68:1, 69:1, 70:1, 71:1, 72:1, 73:1, 74:1, 75:1, 76:1, 77:1, 78:1, 79:1, 80:1, 81:1, 82:1, 83:1, 84:1, 85:1, 86:1, 87:1, 88:1, 89:1, 90:1, 91:1, 92:1, 93:1, 94:1, 95:1, 96:1, 97:1, 98:1, 99:1, 100:1, 101:1, 102:1, 103:1, 104:1, 105:1, 106:1, 107:1, 108:1, 109:1, 110:1, 111:1, 112:1, 113:1, 114:1, 115:1, 116:1, 117:1, 118:1, 119:1, 120:1, 121:1, 122:1, 123:1, 124:1, 125:1, 126:1, 127:1, 128:1, 129:1, 130:1, 131:1, 132:1, 133:1, 134:1, 135:1, 136:1, 137:1, 138:1, 139:1, 140:1, 141:1, 142:1, 143:1, 144:1, 145:1, 146:1, 147:1, 148:1, 149:1, 150:1, 151:1, 152:1, 153:1, 154:1, 155:1, 156:1, 157:1, 158:1, 159:1, 160:1, 161:1, 162:1, 163:1, 164:1, 165:1, 166:1, 167:1, 168:1, 169:1, 170:1, 171:1, 172:1, 173:1, 174:1, 175:1, 176:1, 177:1, 178:1, 179:1, 180:1, 181:1, 182:1, 183:1, 184:1, 185:1, 186:1, 187:1, 188:1, 189:1, 190:1, 191:1, 192:1, 193:1, 194:1, 195:1, 196:1, 197:1, 198:1, 199:1, 200:1, 201:1, 202:1, 203:1, 204:1, 205:1, 206:1, 207:1, 208:1, 209:1, 210:1, 211:1, 212:1, 213:1, 214:1, 215:1, 216:1, 217:1, 218:1, 219:1, 220:1, 221:1, 222:1, 223:1, 224:1, 225:1, 226:1, 227:1, 228:1, 229:1, 230:1, 231:1, 232:1, 233:1, 234:1, 235:1, 236:1, 237:1, 238:1, 239:1, 240:1, 241:1, 242:1, 243:1, 244:1, 245:1, 246:1, 247:1, 248:1, 249:1, 250:1, 251:1, 252:1, 253:1, 254:1, 255:1, 256:1, 257:1, 258:1, 259:1, 260:1, 261:1, 262:1, 263:1, 264:1, 265:1, 266:1, 267:1, 268:1, 269:1, 270:1, 271:1, 272:1, 273:1, 274:1, 275:1, 276:1, 277:1, 278:1, 279:1, 280:1, 281:1, 282:1, 283:1, 284:1, 285:1, 286:1, 287:1, 288:1, 289:1, 290:1, 291:1, 292:1, 293:1, 294:1, 295:1, 296:1, 297:1, 298:1, 299:1, 300:1, 301:1, 302:1, 303:1, 304:1, 305:1, 306:1, 307:1, 308:1, 309:1, 310:1, 311:1, 312:1, 313:1, 314:1, 315:1, 316:1, 317:1, 318:1, 319:1, 320:1, 321:1, 322:1, 323:1, 324:1, 325:1, 326:1, 327:1, 328:1, 329:1, 330:1, 331:1, 332:1, 333:1, 334:1, 335:1, 336:1, 337:1, 338:1, 339:1, 340:1, 341:1, 342:1, 343:1, 344:1, 345:1, 346:1, 347:1, 348:1, 349:1, or 350:1. Further, according to some embodiments, the polyester resin and the organic acid may be present in a weight ratio (B:D) of from about any of the foregoing ratios to about any other of the foregoing ratios. Within this range, the thermoplastic resin composition can have better flame retardancy, chemical resistance, and the like.

The aromatic polyphosphonate and the organic acid may be present in a weight ratio (C:D) of about 1:0.001 to about 1:0.1, for example, about 1:0.005 to about 1:0.05. In some embodiments, the aromatic polyphosphonate and the organic acid may be present in a weight ratio (C:D) of about 1:0.001, 1:0.002, 1:0.003, 1:0.004, 1:0.005, 1:0.006, 1:0.007, 1:0.008, 1:0.009, 1:0.01, 1:0.02, 1:0.03, 1:0.04, 1:0.05, 1:0.06, 1:0.07, 1:0.08, 1:0.09, or 1:0.1. Further, according to some embodiments, the aromatic polyphosphonate and the organic acid may be present in a weight ratio (B:D) of from about any of the foregoing ratios to about any other of the foregoing ratios. Within this range, the thermoplastic resin composition can have better flame retardancy, chemical resistance, and the like.

The thermoplastic resin composition may further comprise typical additive(s) known in the art, as needed. Examples of the additives may include impact modifiers, antioxidants, anti-dripping agents, lubricants, release agents, nucleating agents, antistatic agents, stabilizers, pigments, and/or dyes, and the like, and mixtures and/or combinations thereof, without being limited thereto. In the thermoplastic resin composition, the additives may be present in an amount of about 0.001 parts by weight to about 40 parts by weight, for example, about 0.1 parts by weight to about 10 parts by weight, relative to about 100 parts by weight of the polycarbonate resin, without being limited thereto.

The thermoplastic resin composition may be prepared in pellet form by mixing the aforementioned components, followed by melt extrusion in a typical twin-screw extruder at about 200° C. to about 280° C., for example, about 220° C. to about 270° C.

The thermoplastic resin composition may have a combustion time of about 1 second to about 50 seconds, for example, about 5 seconds to about 45 seconds, as measured on a specimen having a size of 120 mm×13 mm×2 mm in accordance with UL-94. In some embodiments, the thermoplastic resin composition may have a combustion time of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 seconds. Further, according to some embodiments, the thermoplastic resin composition may have a combustion time of from about any of the foregoing times to about any other of the foregoing times.

The thermoplastic resin composition may have a Vicat softening temperature of about 90° C. to about 140° C., for example, about 100° C. to about 135° C., as measured under a load of 5 kg at 50° C./hr in accordance with ISO 306. In some embodiments, the thermoplastic resin composition may have a Vicat softening temperature of about 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, or 140° C. Further, according to some embodiments, the thermoplastic resin composition may have a Vicat softening temperature of from about any of the foregoing temperatures to about any other of the foregoing temperatures.

The thermoplastic resin composition may allow about 5 or fewer specimens, for example, for example, about 3 or fewer specimens, for example, about 5, 4, 3, 2, 1, or 0 specimens, to have cracks when 10 Type I ⅛" thick tensile specimens manufactured in accordance with ASTM D638 are coated with 0.5 mL of a liquid extracted from a cleaning tissue (Product name: Super P Sani-cloth AFIII, Manufacturer: PDI) and left on a 1.0% strain curved jig for 1 minute.

An article according to the present disclosure can be formed of the thermoplastic resin composition set forth above. The thermoplastic resin composition may be prepared in pellet form. The prepared pellets may be produced into various molded articles (products) by various molding methods, such as injection molding, extrusion, vacuum molding, and casting. These molding methods are well known to those skilled in the art. The molded product can have good properties in terms of flame retardancy, heat resistance, chemical resistance, and balance therebetween, and thus can be useful as an interior and/or exterior material for electric and/or electronic products.

Next, the present invention will be described in more detail with reference to some examples. It should be understood that these examples are provided for illustration only and are not to be construed in any way as limiting the present invention.

EXAMPLES

Details of components used in Examples and Comparative Examples are as follows.

(A) Polycarbonate Resin

A bisphenol-A type polycarbonate resin having a weight average molecular weight (Mw) of 25,000 g/mol is used.

(B) Polyester Resin
(B1) Polybutylene terephthalate (PBT, Manufacturer: Bluestar, Product Name: 1130) is used.
(B2) Polyethylene terephthalate (PET, Manufacturer: LCC, Product Name: BCN76) is used.
(C) Phosphorus Based Flame Retardant
(C1) Bisphenol-A polyphosphonate (Manufacturer NOFIA, Product Name: HM9000) having a weight average molecular weight of 70,000 g/mol is used.
(C2) Bisphenol-A polyphosphonate (Manufacturer: NOFIA, Product Name: HM1100) having a weight average molecular weight of 120,000 g/mol is used.
(C3) Bisphenol-A polyphosphonate (Manufacturer: NOFIA, Product Name: HM7000) having a weight average molecular weight of 60,000 g/mol is used.
(C4) Monomolecular weight bisphenol-A bis(diphenyl phosphate) (Manufacturer DAIHACHI, Product Name: DVP506) is used.
(D) Organic Acid
(D1) Citric acid (Manufacturer: Samchun Chemical Co., Ltd.) is used.
(D2) Tartaric acid (Manufacturer: Samchun Chemical Co., Ltd.) is used.

Examples 1 to 13 and Comparative Examples 1 to 8

The aforementioned components are mixed in amounts as listed in Tables 1, 2 and 3, followed by extrusion at 260° C., thereby preparing armoplastic resin composition in pellet form. Here, extrusion is performed using a twin-screw extruder (L/D: 36, Φ: 45 mm). The prepared pellets are dried at 80° C. for 4 hours or more and then subjected to injection molding using a 6 oz. injection machine (molding temperature: 260° C., mold temperature: 60° C.), thereby preparing a specimen. The prepared specimen is evaluated as to the following properties. Results are shown in Tables 1 to 3.

Property Evaluation
(1) Flame retardancy: Combustion time (unit: second) is measured on a specimen having a size of 120 mm×13 mm×2 mm in accordance with UL-94.
(2) Heat resistance: Vicat softening temperature (unit: ° C.) is measured under a load of 5 kg at 50° C./hr in accordance with ISO 306.
(3) Chemical resistance: The number of specimens suffering from cracking is counted after 10 Type I ⅛" thick tensile specimens manufactured in accordance with ASTM D638 are coated with 0.5 mL of a liquid extracted from a cleaning tissue (Product name: Super P Sani-cloth AFIII, Manufacturer: PDI) and are left on a 1.0% strain curved jig for 1 minute.

TABLE 1

| | Example | | | | | | |
|---|---|---|---|---|---|---|---|
| | 1 | 2 | 3 | 4 | 5 | 6 | 7 |
| (A) (parts by weight) | 100 | 100 | 100 | 100 | 100 | 100 | 100 |
| (B1) (parts by weight) | 150 | 200 | 80 | 100 | 50 | 50 | 100 |
| (B2) (parts by weight) | — | — | — | — | — | — | — |
| (C1) (parts by weight) | — | — | — | — | 10 | 20 | 50 |
| (C2) (parts by weight) | 50 | 150 | 20 | 50 | — | — | — |
| (C3) (parts by weight) | — | — | — | — | — | — | — |
| (C4) (parts by weight) | — | — | — | — | — | — | — |
| (D1) (parts by weight) | 0.5 | 1.0 | 0.5 | 0.5 | 0.5 | 0.5 | 0.5 |
| (D2) (parts by weight) | — | — | — | — | — | — | — |
| Combustion time (sec) | 40 | 35 | 38 | 25 | 25 | 29 | 16 |
| VST (° C.) | 120 | 110 | 130 | 120 | 120 | 115 | 126 |
| Number of cracked specimens | 0 | 0 | 0 | 0 | 0 | 2 | 1 |

TABLE 2

| | Example | | | | | |
|---|---|---|---|---|---|---|
| | 8 | 9 | 10 | 11 | 12 | 13 |
| (A) (parts by weight) | 100 | 100 | 100 | 100 | 100 | 100 |
| (B1) (parts by weight) | 100 | 100 | 150 | — | — | 80 |
| (B2) (parts by weight) | — | — | — | 50 | 100 | — |
| (C1) (parts by weight) | 100 | 100 | 100 | 20 | 50 | — |
| (C2) (parts by weight) | — | — | — | — | — | 20 |
| (C3) (parts by weight) | — | — | — | — | — | — |
| (C4) (parts by weight) | — | — | — | — | — | — |
| (D1) (parts by weight) | 0.5 | 1.0 | 1.5 | 0.2 | 0.5 | — |
| (D2) (parts by weight) | — | — | — | — | — | 0.5 |
| Combustion time (sec) | 14 | 18 | 12 | 26 | 20 | 38 |
| VST (° C.) | 121 | 117 | 113 | 111 | 109 | 128 |
| Number of cracked specimens | 1 | 0 | 0 | 2 | 0 | 1 |

TABLE 3

| | Comparative Example | | | | | | | |
|---|---|---|---|---|---|---|---|---|
| | 1 | 2 | 3 | 4 | 5 | 6 | 7 | 8 |
| (A) (parts by weight) | 100 | 100 | 100 | 100 | 100 | 100 | 100 | 100 |
| (B1) (parts by weight) | 40 | 260 | 100 | 100 | 100 | 100 | 100 | 100 |
| (B2) (parts by weight) | — | — | — | — | — | — | — | — |
| (C1) (parts by weight) | 50 | 50 | 5 | 220 | — | — | 50 | 50 |
| (C2) (parts by weight) | — | — | — | — | — | — | — | — |
| (C3) (parts by weight) | — | — | — | — | 50 | — | — | — |
| (C4) (parts by weight) | — | — | — | — | — | 50 | — | — |
| (D1) (parts by weight) | 0.5 | 0.5 | 0.5 | 0.5 | 0.5 | 0.5 | 0.05 | 3 |
| (D2) (parts by weight) | — | — | — | — | — | — | — | — |
| Combustion time (sec) | 40 | 150 | 150 | 40 | 150 | 150 | 150 | 150 |
| VST (° C.) | 120 | 80 | 130 | 80 | 80 | 80 | 120 | 110 |
| Number of cracked specimens | 7 | 0 | 0 | 2 | 3 | 7 | 7 | 7 |

From the results, it can be seen that the thermoplastic resin composition according to the present disclosure has good properties in terms of flame retardancy, heat resistance, and chemical resistance.

Conversely, it can be seen that the thermoplastic resin composition prepared using a smaller amount of the polyester resin (Comparative Example 1) than thermoplastic resin composition according to the present disclosure suffers from deterioration in chemical resistance; the thermoplastic resin composition prepared using a higher amount of the polyester resin (Comparative Example 2) suffers from deterioration in flame retardancy and heat resistance; the thermoplastic resin composition prepared using a smaller amount of the aromatic polyphosphonate (Comparative Example 3) suffers from deterioration in flame retardancy; and the thermoplastic resin composition prepared using a higher amount of the aromatic polyphosphonate (Comparative Example 4) suffers from deterioration in heat resistance. In addition, it can be seen that the thermoplastic resin composition prepared using an aromatic polyphosphonate (C3) having a smaller weight average molecular weight than aromatic polyphosphonate according to the present disclosure (Comparative Example 5) suffers from deterioration in flame retardancy and heat resistance; and the thermoplastic resin composition prepared using the monomolecular aromatic polyphosphate (C4) (Comparative Example 6) suffers from deterioration in flame retardancy, heat resistance, and chemical resistance. Further, it can be seen that the thermoplastic resin composition prepared using a smaller amount of the organic acid (Comparative Example 7) suffers from deterioration in flame retardancy and chemical resistance; and the thermoplastic resin composition prepared using a higher amount of the organic acid (Comparative Example 8) suffers from deterioration in flame retardancy and chemical resistance.

Exemplary embodiments have been disclosed herein, and although specific terms are employed, unless otherwise noted, they are to be interpreted in a generic and descriptive sense only and not for purpose of limitation. Also although some embodiments have been described above, it should be understood that these embodiments are provided for illustration only and are not to be construed in any way as limiting the present invention, and that various modifications, changes, alterations, and equivalent embodiments can be made by those skilled in the art without departing from the spirit and scope of the invention. The scope of the present invention should be defined by the appended claims and equivalents thereof.

It is within the scope of this disclosure for one or more of the terms "substantially," "about," "approximately," and/or the like, to qualify each adjective and adverb of the foregoing disclosure to provide a broad disclosure. As an example, it is believed those of ordinary skill in the art will readily understand that, in different implementations of the features of this disclosure, reasonably different engineering tolerances, precision, and/or accuracy may be applicable and suitable for obtaining the desired result. Accordingly, it is believed those of ordinary skill will readily understand usage herein of the terms such as "substantially," "about," "approximately," and the like.

For example, all numerical values provided throughout this disclosure can be approximate, and for each range specified in this disclosure, all values within the range and all subranges within the range are also disclosed. Approximate values can be calculated, and it is believed that each value can vary by plus or minus about 25%, plus or minus about 20%, plus or minus about 15%, plus or minus about 10%, plus or minus about 5%, plus or minus about 1%, or less than about 1%, including all values and subranges therebetween for each of the above ranges.

The use of the term "and/or" includes any and all combinations of one or more of the associated listed items.

What is claimed is:

1. A thermoplastic resin composition comprising:
   about 100 parts by weight of a polycarbonate resin;
   about 50 parts by weight to about 125 parts by weight of a polyester resin;
   about 100 parts by weight to about 200 parts by weight of an aromatic polyphosphonate having a weight average molecular weight of about 65,000 g/mol to about 130,000 g/mol; and
   about 0.1 parts by weight to about 2 parts by weight of an organic acid comprising citric acid, lactic acid, malic acid, tartaric acid, and/or glycolic acid,
   wherein the aromatic polyphosphonate and the organic acid are present in a weight ratio of about 1:0.005 to about 1:0.05.

2. The thermoplastic resin composition according to claim 1, wherein the polyester resin comprises polyethylene terephthalate, polybutylene terephthalate, polyethylene naphthalate, polytrimethylene terephthalate, and/or polycyclohexylene terephthalate.

3. The thermoplastic resin composition according to claim 1, wherein the polyester resin comprises polyethylene terephthalate and/or polybutylene terephthalate.

4. The thermoplastic resin composition according to claim 1, wherein the aromatic polyphosphonate is represented by Formula 1:

[Formula 1]

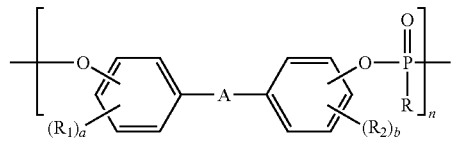

wherein each A is independently a single bond, a $C_1$ to $C_5$ alkylene group, a $C_1$ to $C_5$ alkylidene group, a $C_5$ to $C_6$ cycloalkylidene group, —S— or —$SO_2$—; each R is independently a substituted or unsubstituted $C_6$ to $C_{20}$ aryl group; $R_1$ and $R_2$ are each independently a substituted or unsubstituted $C_1$ to $C_6$ alkyl group, a substituted or unsubstituted $C_3$ to $C_6$ cycloalkyl group, a substituted or unsubstituted $C_6$ to $C_{12}$ aryl group, or a halogen atom; a and b are each independently an integer of 0 to 4; and n is an integer of 100 to 450.

5. The thermoplastic resin composition according to claim 4, wherein the polyester resin and the aromatic polyphosphonate are present in a weight ratio of about 1:0.1 to about 1:1.5.

6. The thermoplastic resin composition according to claim 1, wherein the polyester resin and the organic acid are present in a weight ratio of about 50:1 to about 350:1.

7. The thermoplastic resin composition according to claim 1, wherein the thermoplastic resin composition has a combustion time of about 1 second to about 50 seconds, as measured on a specimen having a size of 120 mm×13 mm×2 mm in accordance with UL-94.

8. The thermoplastic resin composition according to claim 1, wherein the thermoplastic resin composition has a Vicat softening temperature of about 90° C. to about 140° C., as measured under a load of 5 kg at 50° C./hr in accordance with ISO 306.

9. The thermoplastic resin composition according to claim 1, wherein the thermoplastic resin composition allows about 5 or fewer specimens to have cracks when 10 Type I 1/8" thick tensile specimens manufactured in accordance with ASTM D638 are coated with 0.5 mL of a liquid extracted from a cleaning tissue and left on a 1.0% strain curved jig for 1 minute.

10. An article formed of the thermoplastic resin composition according to claim 1.

11. The thermoplastic resin composition according to claim 1, wherein the thermoplastic resin composition has a combustion time of about 1 second to about 50 seconds, as measured on a specimen having a size of 120 mm×13 mm×2 mm in accordance with UL-94; a Vicat softening temperature of about 90° C. to about 140° C., as measured under a load of 5 kg at 50° C./hr in accordance with ISO 306; and allows about 5 or fewer specimens to have cracks when 10 Type I 1/8" thick tensile specimens manufactured in accordance with ASTM D638 are coated with 0.5 mL of a liquid extracted from a cleaning tissue and left on a 1.0% strain curved jig for 1 minute.

12. The thermoplastic resin composition according to claim 11, wherein the thermoplastic resin composition allows about 3 or fewer specimens to have cracks when 10 Type I 1/8" thick tensile specimens manufactured in accordance with ASTM D638 are coated with 0.5 mL of a liquid extracted from a cleaning tissue and left on a 1.0% strain curved jig for 1 minute.

13. The thermoplastic resin composition according to claim 1, wherein the polyester resin and the aromatic polyphosphonate are present in a weight ratio of about 1:0.8 to about 1:1.5.

14. A thermoplastic resin composition comprising:
about 100 parts by weight of a polycarbonate resin;
about 50 parts by weight to about 200 parts by weight of a polyester resin;
about 130 parts by weight to about 200 parts by weight of an aromatic polyphosphonate having a weight average molecular weight of about 65,000 g/mol to about 130,000 g/mol; and
about 0.1 parts by weight to about 2 parts by weight of an organic acid comprising citric acid, lactic acid, malic acid, tartaric acid, and/or glycolic acid,
wherein the aromatic polyphosphonate and the organic acid are present in a weight ratio of about 1:0.005 to about 1:0.05.

15. A thermoplastic resin composition comprising:
about 100 parts by weight of a polycarbonate resin;
about 50 parts by weight to about 250 parts by weight of a polyester resin;
about 150 parts by weight to about 200 parts by weight of an aromatic polyphosphonate having a weight average molecular weight of about 65,000 g/mol to about 130,000 g/mol; and
about 0.1 parts by weight to about 2 parts by weight of an organic acid comprising citric acid, lactic acid, malic acid, tartaric acid, and/or glycolic acid,
wherein the aromatic polyphosphonate and the organic acid are present in a weight ratio of about 1:0.005 to about 1:0.05.

* * * * *